United States Patent [19]
Tomé

[11] Patent Number: 6,101,887
[45] Date of Patent: Aug. 15, 2000

[54] WINDSHIELD WIPER DRIVE MECHANISM

[75] Inventor: Robert Tomé, Rochester Hills, Mich.

[73] Assignee: Valeo Wiper Systems, Livonia, Mich.

[21] Appl. No.: 09/145,660

[22] Filed: Sep. 2, 1998

[51] Int. Cl.[7] ............................... F16H 21/16; A47L 1/00
[52] U.S. Cl. ............................. 74/25; 74/559; 15/250.14
[58] Field of Search ........................... 74/25, 559, 569, 74/421 A; 15/250.14, 250.16, 250.27, 250.3

[56] References Cited

U.S. PATENT DOCUMENTS 4,253,434  3/1981  Takizawa et al. ..................... 74/559

FOREIGN PATENT DOCUMENTS

| 3826-506 | 8/1988 | Germany | 15/250.3 |
| 4323551-A1 | 7/1992 | Germany | 15/250.3 |
| 1142-325 | 3/1983 | U.S.S.R. | 15/250.3 |
| 875036 | 8/1961 | United Kingdom | 15/250.3 |

Primary Examiner—David A. Bucci
Assistant Examiner—Colby Hansen
Attorney, Agent, or Firm—Morgan & Finnegan, LLP

[57] ABSTRACT

A windshield wiper drive mechanism comprises a casing housing a motor and a reciprocating mechanism for converting the rotary motion of the motor to a reciprocating motion of an output shaft. Damping mechanism are provided for damping the rotation of the shaft comprising a cam and a resilient element for applying a radial damping force to the shaft at least towards the limits of its reciprocal movement. The resilient element can act directly on the cam or alternatively it may be part of the cam itself.

21 Claims, 7 Drawing Sheets

WINDSHIELD WIPER DRIVE MECHANISM

FIELD OF THE INVENTION

The invention relates to a windshield wiper drive mechanism having damping means for braking the reciprocating movement of the drive mechanism.

BACKGROUND OF THE INVENTION

Windshield wiper drive mechanisms generally comprise a motor connected to a reciprocating mechanism which converts the rotary motion of the motor into a reciprocating motion of an output shaft. The output shaft may itself comprise the spindle of a wiper arm, or it may drive the wiper arm or arms via a suitable linkage. The reciprocating mechanism is designed to rotate the output shaft to and fro through an angle of rotation corresponding to the angular sweep of the wiper blades, which can vary from approximately 90° to as much as 180° depending on the design of the vehicle.

Wiper blades and their associated drive mechanisms have significant inertia and the reversal of movement of the output shaft at the limits of its reciprocating movement causes substantial shocks in the drive mechanism which may be noticeable to the vehicle occupants and which can result in rapid wear and even failure of the mechanism during extensive use. To overcome this problem, means have been proposed to brake the output shaft at least towards the limits of its reciprocating movement. This takes up the free play in the mechanism at this point and results in a cushioned reversal of movement of the wiper blades.

Various mechanisms have been proposed for achieving this. In one arrangement, a key on the output shaft drives a threaded collar which winds and unwinds during reciprocation of the shaft to move the collar to and fro along the shaft. The ends of the collar engage resilient washers which apply an axial load to the shaft, thereby damping movement of the shaft at the ends of its reciprocating motion. In another prior arrangement for limiting the sweeping angle of the windscreen wipers, the brake comprises a part-pinion having teeth which engage with stops formed on the end of a circular wire spring. These known arrangements are relatively complicated and significantly add to the cost of the drive mechanism.

It is an object of the present invention to provide an improved windshield wiper drive mechanism having damping means for braking the to and fro movement of the output shaft at least towards the limits of it reciprocating movement.

It is a further object of the present invention to provide such a mechanism in a simple and inexpensive form.

SUMMARY OF THE INVENTION

It is proposed to overcome the drawbacks of the known arrangements by providing a windshield wiper drive mechanism comprising a casing, an output shaft rotatably mounted in the casing, a motor for driving the output shaft, reciprocating means for converting the rotary motion of the motor into a reciprocating motion of the output shaft, and damping means for damping the rotation of the shaft at least towards the limits of its reciprocating motion, the damping means comprising resilient means operable to apply a radially-directed damping force to the output shaft.

The radially-directed damping force is suitably applied to the output shaft by cam means rotatable with the output shaft which are adapted to brake the output shaft by resilient engagement with a complimentary braking surface. In one embodiment, the cam means comprises a cam profile which engages a spring fixed to the housing. In another embodiment, the cam profile itself carries a resilient member which is engagable with a fixed abutment to provide the braking effect.

The cam means may be operable to apply a damping force to the output shaft either at or near the limits of its reciprocal movement or alternatively over substantially all its movement, the damping force increasing as the output shaft reaches the limits of its reciprocal movement.

Embodiments of the invention will now be described in detail, with reference to the accompanying drawings.

BRIEF DESCRIPTION OF THE DRAWINGS

FIG. 4b is a cross-sectional view of the damping means of FIG. 4a;

FIG. 4c is a cross-sectional view of the damping means of FIG. 4a taken along the lines 4C—4C of FIG. 4b;

FIG. 5b is a cross-sectional view of the damping means of FIG. 5a; and

DESCRIPTION OF THE PREFERRED EMBODIMENTS OF THE INVENTION

Figure 1:
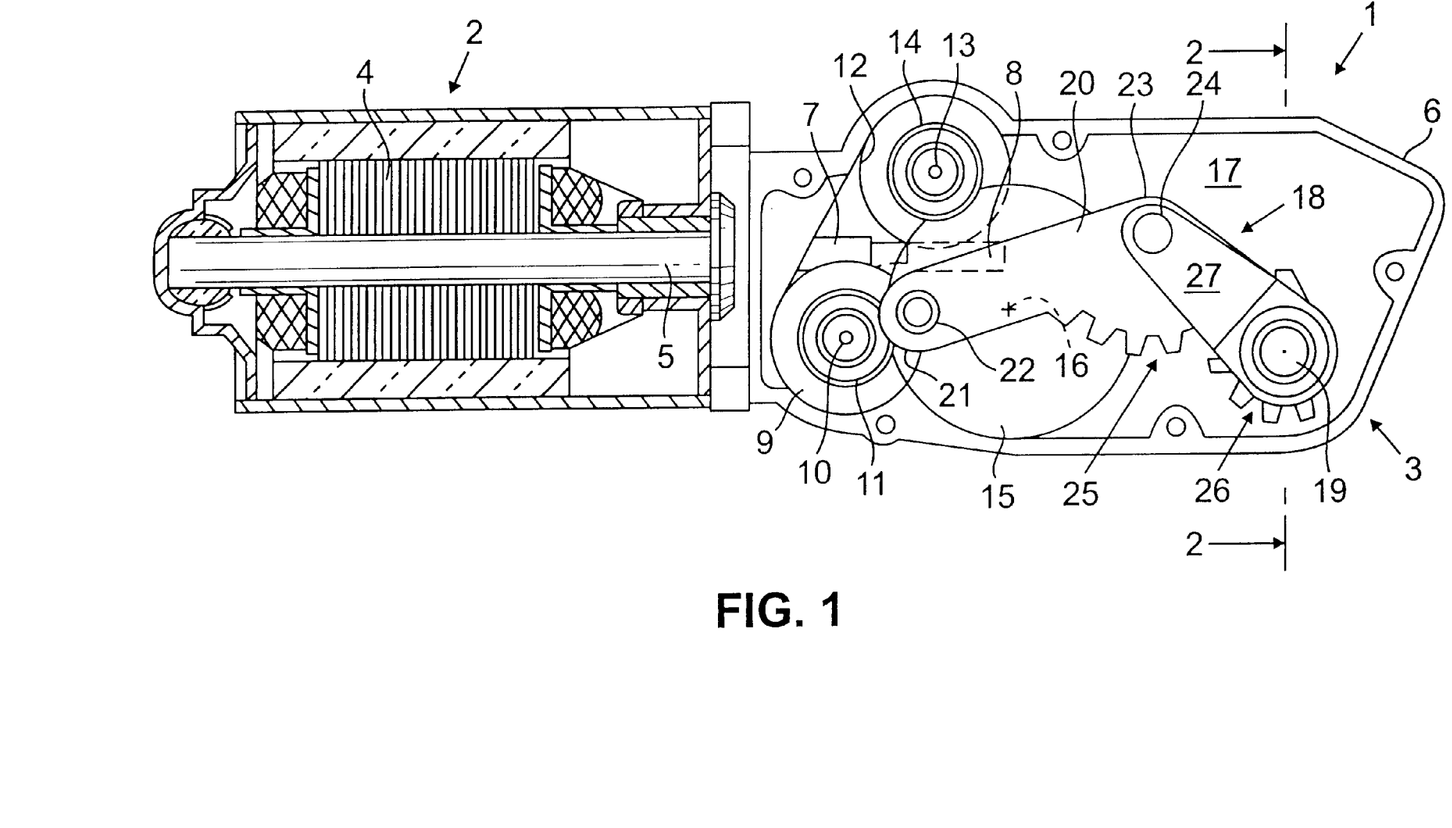
FIG. 1 is a cross sectional view of a windshield wiper drive mechanism comprising an electric motor and associated reciprocating mechanism, to which the invention is applied.
Figure 2:
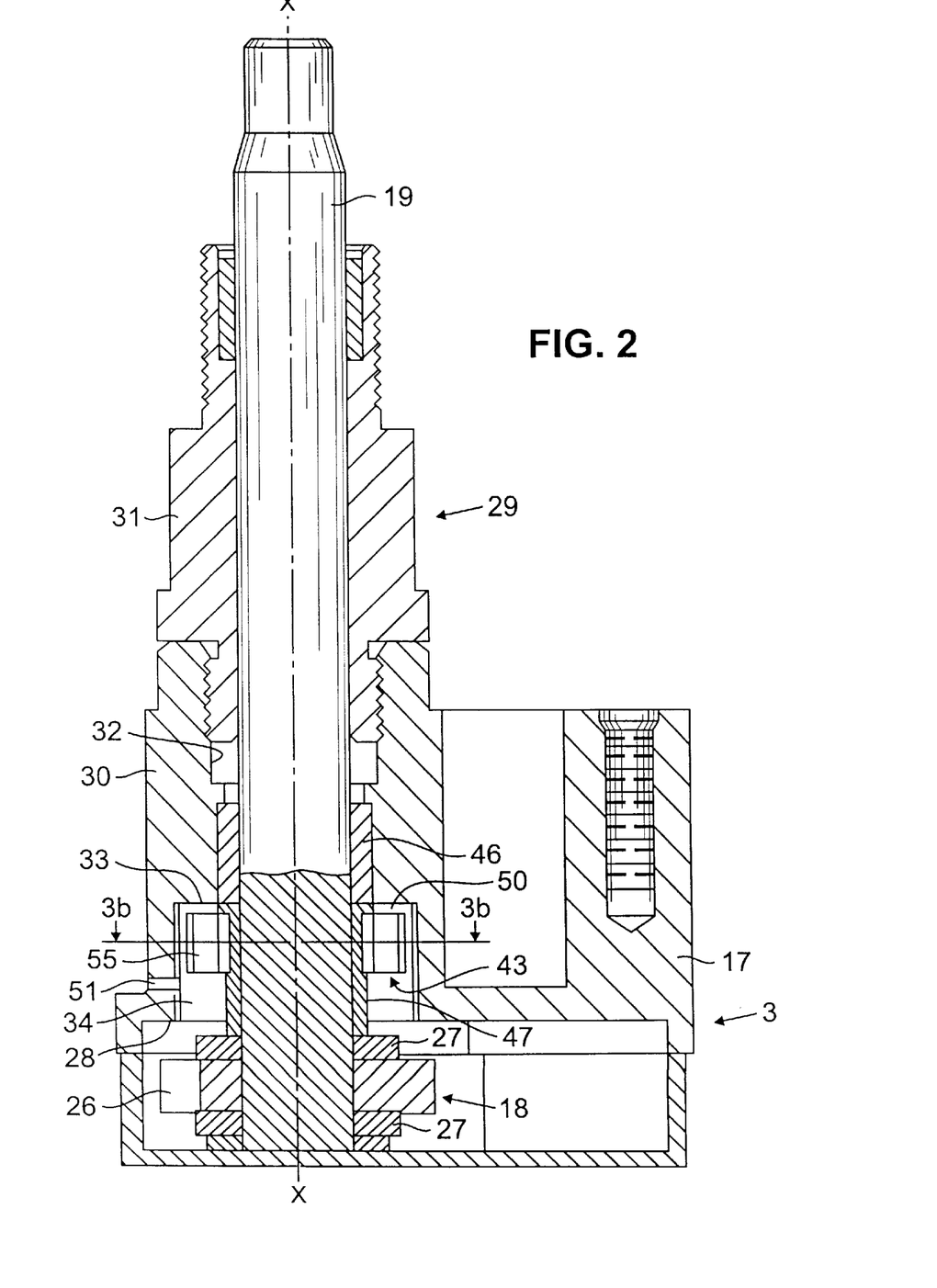
FIG. 2 is a sectional view taken along the line 2—2 of FIG. 1 showing the output shaft of the drive mechanism.

FIGS. 1 and 2 show a windshield wiper drive mechanism 1 to which the present invention has been applied. In this case, the mechanism consists of a geared motor but the invention may be applied to any other suitable transmission without departing from its scope. For example, the drive motor may be caused to reciprocate electronically.

The windshield wiper drive mechanism 1 comprises an electric motor 2 and a reduction gear and reciprocating arrangement 3. The electric motor 2 comprises a rotor 4 having a rotor shaft 5 which extends into a housing 6 of the reduction gear assembly 3. The rotor shaft 5 has two worm gears 7,8 fitted to its free end. A primary pinion 9 cooperates with worm gear 7 and has an axis 10 perpendicular to the general axis of the rotor shaft 5. Primary pinion 9 carries a smaller diameter secondary pinion 11 concentric and integral therewith.

Cooperating with worm gear 8 is a primary pinion 12 having an axis 13 substantially parallel to axis 10, the pinion 12 carrying a secondary pinion 14 also having a smaller diameter and being concentric and integral therewith. The diameters of the primary pinions 9 and 12 are identical, as are the diameters of the secondary pinions 11 and 14, and the axes 10,13 are disposed on both sides of the axis of the shaft 5 and are spaced equally therefrom.

Secondary pinions 11,14 mesh with a gear-wheel 15 having an axis of rotation 16 substantially parallel to the axes 10,13. The gears 11,14 and 15 are supported for rotation in the base 17 of housing 6, and form, with the shaft 5 with its worm gears 7,9 associated with pinions 9 and 12, a reduction gear system.

Gear-wheel 15 is operable to actuate a reciprocating mechanism which converts the rotary motion of rotor 4 into a reciprocating motion of an output shaft 19 having an axis X—X substantially parallel to the axes 10,13 and 16 and which is supported by the base 17 of housing 6.

The reciprocating mechanism comprises connecting rod assembly 18 consisting of an arm 20 rotatably connected at one of its ends 21 to the gear-wheel 15 by a pin 22 disposed eccentrically in relation to the axis 16 of wheel 15, whilst being parallel thereto. The other end 23 of arm 20 carries a pin 24, and concentrically with said pin, a toothed segment 25 capable of moving around pin 24. Toothed segment 25 meshes with a toothed segment 26 provided concentrically and integrally with output shaft 19.

Output shaft 19 is provided with end plates 27 disposed on both sides of the toothed segments 25,26. These end plates rotate freely around the output shaft 19, and are connected by pin 24 to arm 20. Pin 24 is mounted in a rotationally fixed manner to the end plates 27 so that it permits an oscillation of the arm 20 around pin 24.

Output shaft 19 passes substantially perpendicularly through aperture 28 in the base 17 of the housing 6 into a tubular column 29 which is concentric with aperture 28. Column 29 consist essentially of two parts, namely a pedestal 30 formed integrally with housing 6; and a cap 31 which fits over and is screwed into pedestal 30. The free end of output shaft 19 either itself comprises the windshield wiper spindle or is connected directly to the windshield wiper drive mechanism.

Pedestal 30 is formed with a central bore 32 which accommodates output shaft 19. At its lowermost section, bore 32 is enlarged by a shoulder 33 to provide a cylindrical housing 34 which accommodate damping means for damping the reciprocating motion of the output shaft 19.

Figure 3A:
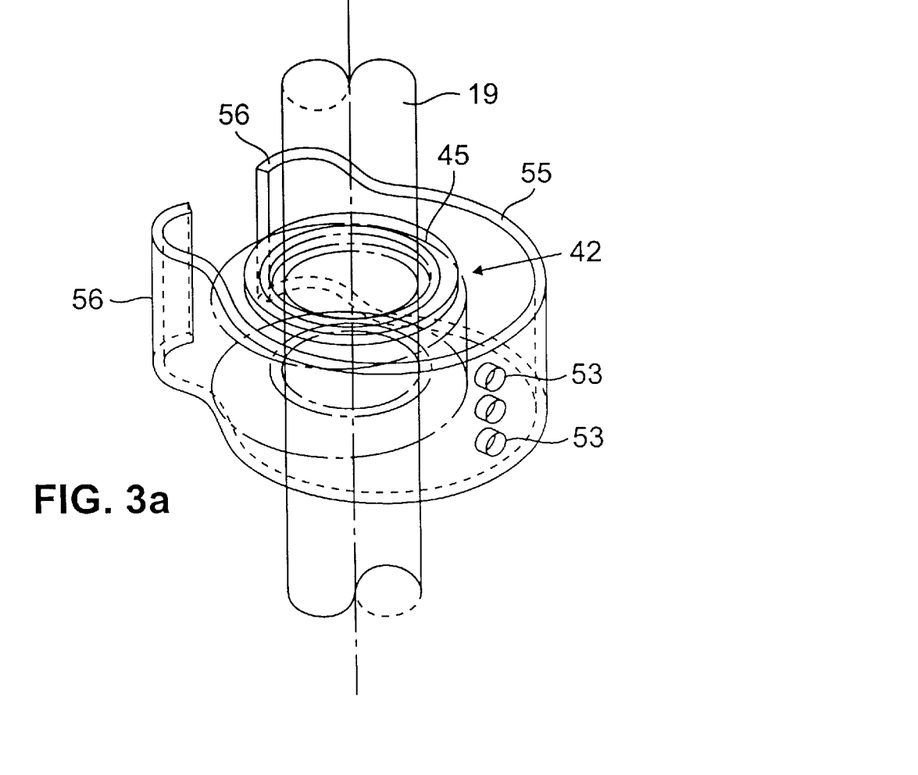
FIG. 3a is a perspective view of the damping means of the mechanism shown in FIG. 2.
Figure 3B:
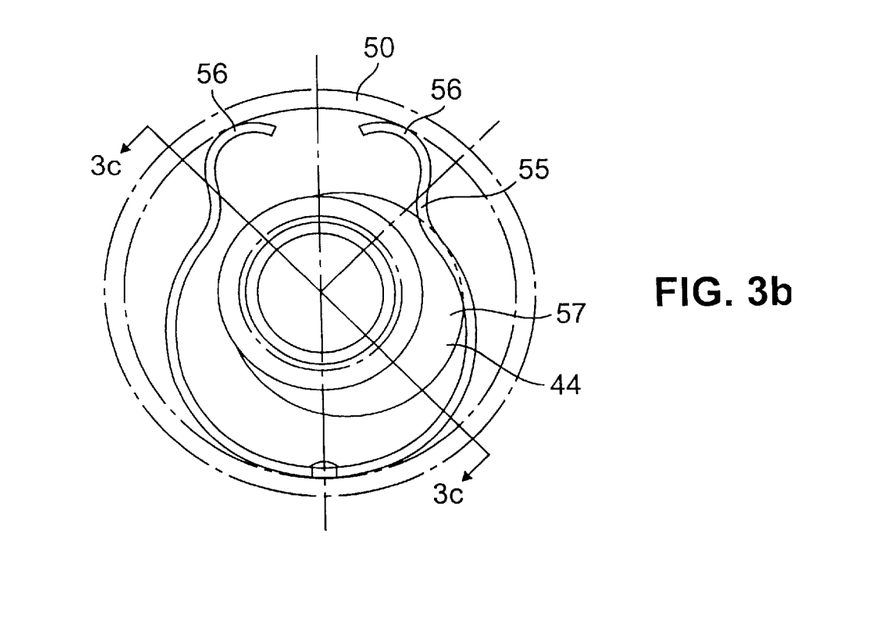
FIG. 3b is a cross-sectional view of the damping means taken along the line 3b—3b of FIG. 2.
Figure 3C:
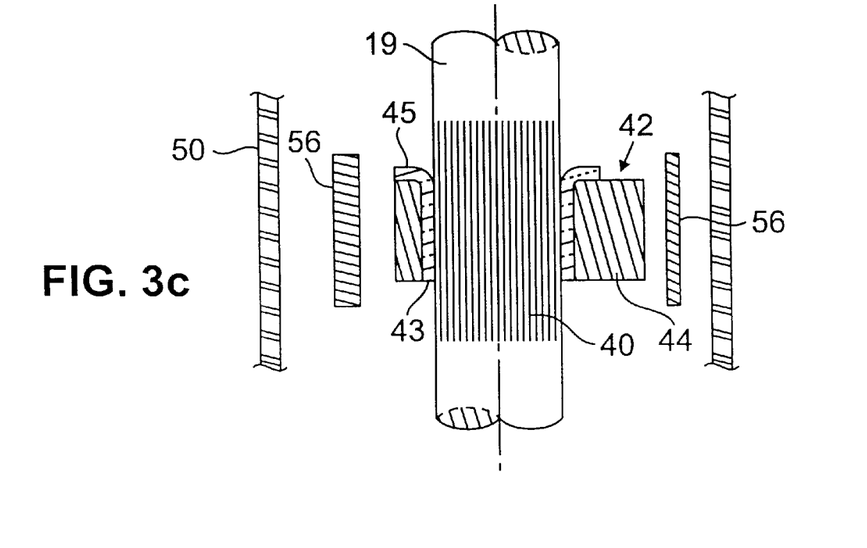
FIG. 3c is a cross-sectional view of the damping means of FIGS. 3a and 3b, taken along the lines 3C—3C of FIG. 3b.

The damping means are more readily seen from FIGS. 3*a*, 3*b* and 3*c*.

The outer surface of output shaft 19 is provided with splines 40 at the point where it extends through cylindrical housing 34, and a cam element 42 is fitted over these splines for rotation with the shaft. Cam element 42 comprises a collar 43 having internal splines matching splines 40, and a cam profile 44 mounted on collar 43.

Suitably, collar 43 is made of metal, and cam profile 44 is molded over said collar from plastic material. The upper end wall of collar 43 is turned outwardly to form a circular flange 45 which forms an abutment surface which engages with a cylindrical spacer 46 disposed over output shaft 19. Longitudinal location of cam element 42 on shaft 19 at the opposite side thereof is ensured by cylindrical spacer 47 which is also internally splined, the upper end of spacer 47 engaging collar 43 while its lower end engages the uppermost end plate 27 (as seen in FIG. 2).

Cylindrical spacers 46,47 thus fix the cam element 42 in position longitudinally of shaft 19, while splines 40 ensure that cam element 42 reciprocates with output shaft 19.

Cylindrical housing 34 in pedestal 30 is provided with an annular sleeve 50 which fits precisely into housing 34 and which is secured therein by means of screws, one shown 51. Secured within this sleeve 50 by rivets 52 which pass through holes 53 is a generally cylindrical C-shaped metal sprint 55 which extends around the output shaft 19 within housing 34 to substantially surround cam element 42. C-shaped spring 55 is formed with a pair of arms 56 and the rivets 52 which secure spring 55 to the sleeve 50 are located intermediate these two arms.

The arms 56 of spring 55 provide resilient cam surfaces which are engaged by cam profile 44 of cam member 42 as it moves towards the limits of the reciprocal movement of shaft 19, to apply a radially-directed directed damping force to the shaft so as to damp brake the shaft and provide a cushioned reversal of movement of the wiper arms.

It will be apparent from FIG. 3*b* that cam element 42 is intended to rotate to and fro over an angle of reciprocation of approximately 180°. It will be apparent that the damping angle and the degree of radial damping force applied to shaft 19 can readily be chosen by varying the shape of cam profile 44 and/or the shape or strength of spring 55. It will also be noted that, if required, a radially-direct damping force may be applied to shaft 19 during most or all of its reciprocal movement by suitable choice of these items.

Figure 4A:
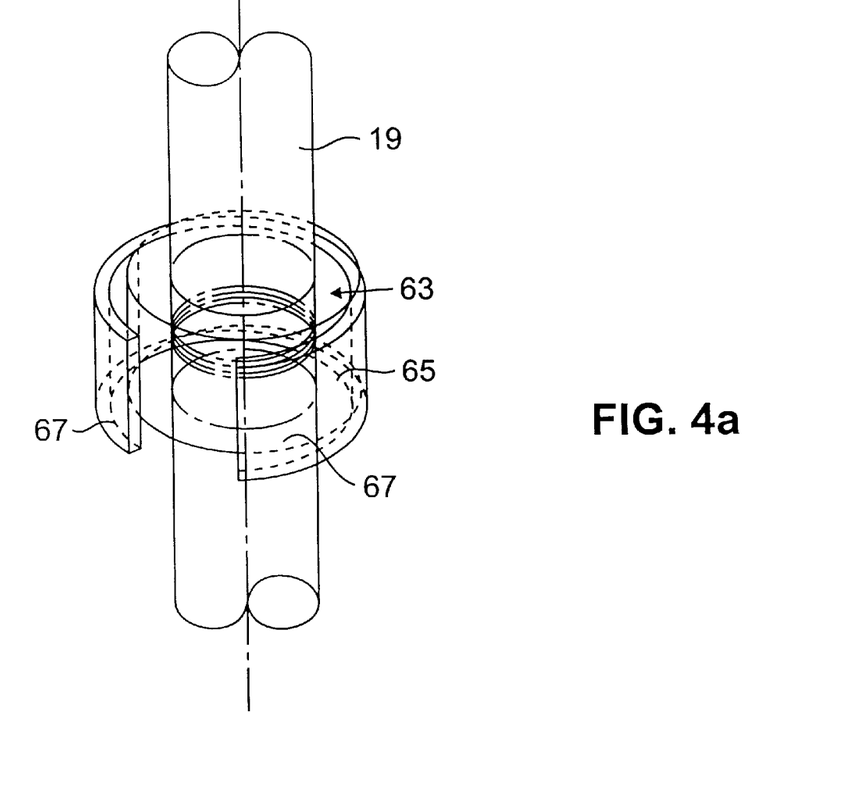
FIG. 4a is a perspective view of an alternative damping means for a windshield wiper drive mechanism.
Figures 4B, 4C:
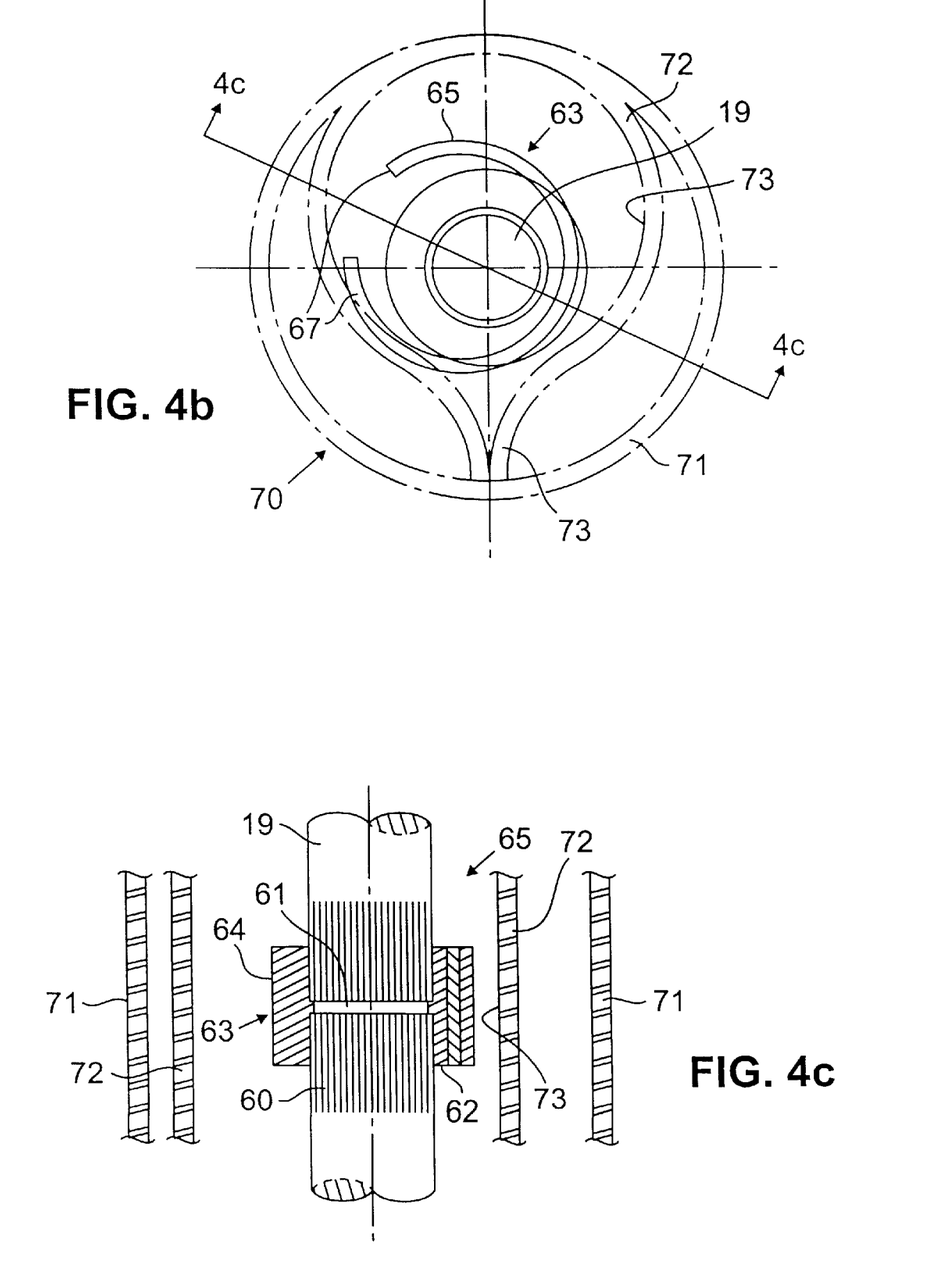

FIGS. 4*a*, 4*b* and 4*c* illustrate an alternative damping means for damping the reciprocating motion of the output shaft 19.

As with the embodiment shown in FIGS. 3*a*–3*c*, shaft 19 is provided with splines 60 on its outer surface and in this case is additionally formed with a circular locking groove 61. A cam element 63 comprises a generally circular collar 64 having internal splines for engagement with splines 60 and a radial flange 62 for engagement with locking groove 61. Collar 64 is molded from plastic material and is force-fitted over shaft 19 such that it engages with splines 60 and annular groove 61 to lock cam element 63 to the shaft 19 both longitudinally and in rotation. Cam element 63 carries a part-cylindrical C-shaped spring element 65 fixed thereto. The free arms 67 of spring element 65 are curved around shaft 19 and reciprocate to and fro over the wiping angle as shaft 19 and cam element 63 rotate. Arms 67 of spring 65 thus constitute resilient cam surfaces of cam element 63.

In this embodiment, in place of the cylindrical sleeve 50 of FIGS. 1 to 3*a*, a molded plastic formation 70 is located within housing 34 consisting of a cylindrical outer wall element 71 and a generally cylindrical inner wall element 72 moulded integrally therewith and supported within the cylindrical outer wall 71 by wall extensions 73. The longitudinal axis of outer cylindrical wall element 71 is co-axial with shaft 19, but the axis of inner cylindrical wall element 72 is eccentrically located in relation to shaft 19. The inner wall of inner cylindrical wall element 72 thereby provides an engagement surface for arms 67 of spring 65 during the reciprocal motion of cam element 63, as it rotates to and fro within the inner wall element 72. In this embodiment, the arms 67 of spring 65 remain in contact at all tmes with the inner wall of wall element 72, thereby applying a damping force to shaft 19 during its entire reciprocating movement, the damping force increasing towards the ends of its reciprocal movement by virture of the eccentric axis of wall element 72.

Figure 5A:
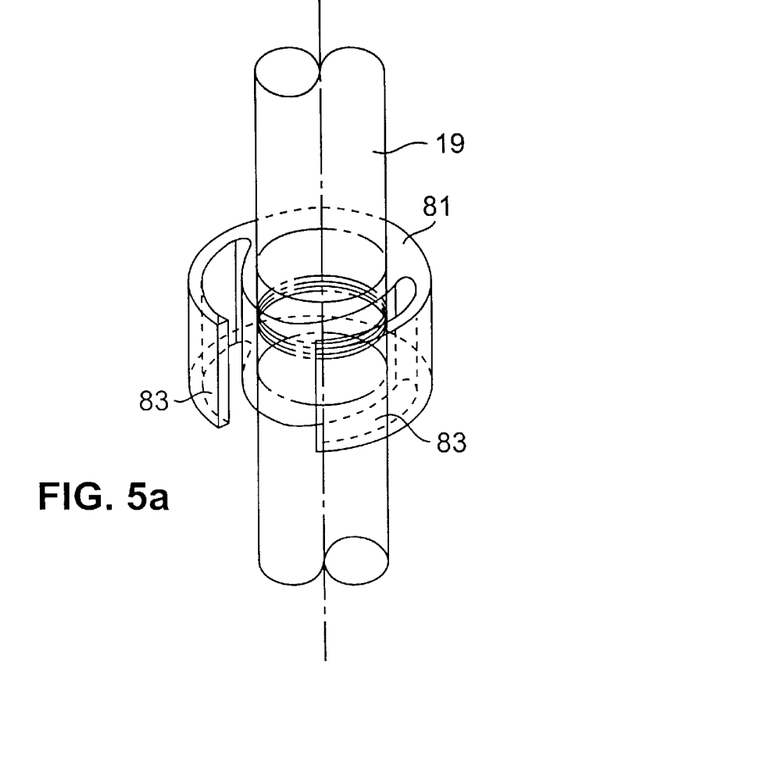
FIG. 5a is another embodiment of damping means for a windshield wiper drive mechanism.
Figure 5B:
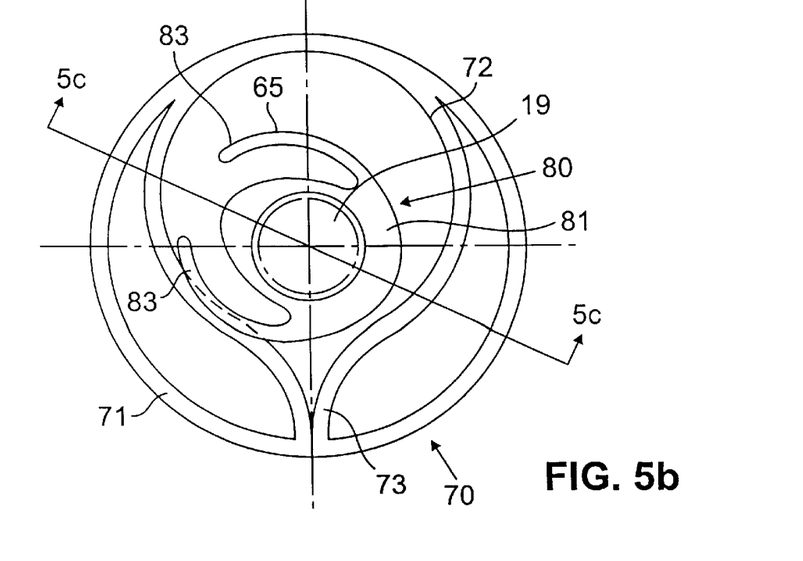
Figure 5C:
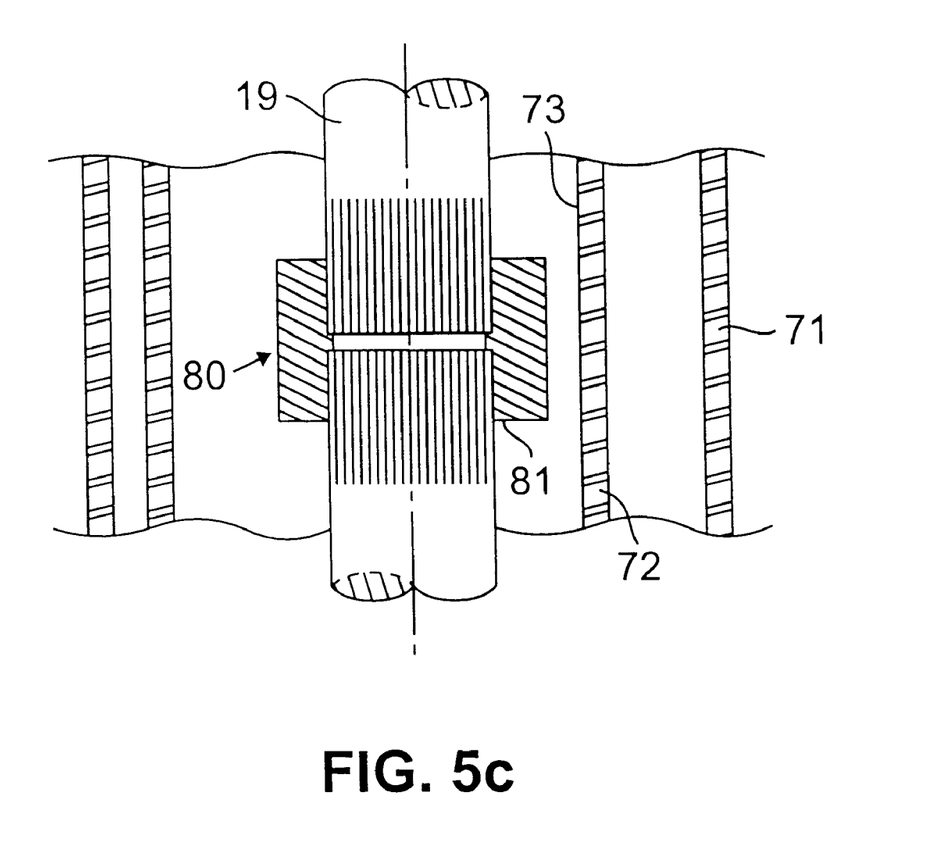
FIG. 5c is a cross-sectional view taken along the line 5C—5C of FIG. 5b.

FIGS. 5*a*, 5*b* and 5*c* show a variation of this embodiment. In this arrangement, the cylindrical formation 70 is identical to that shown in FIG. 4*b* and a cam element 80 is fitted to shaft 19 in the same manner as that shown in the preceeding figures, i.e. it is force-fitted over the shaft to engage with the splines 60 and circular locking 61. In this case however the cam element is molded integrally in one piece from a resilient plastics material. Cam element 80 comprises a generally circular central boss 81 rotatable within the inner cylindrical wall element 72 and provided with radially extending molded plastic arms 83 which sweep the inner wall of wall element 72. Arms 83 are of equal thickness and are shaped to follow the surface of a cylinder so that they apply an equal radially-directed damping force to the shaft 19 as they engage wall 72.

The damping means detailed above are simple and cheap to manufacture and are easily assembled with the drive mechanism. Also, they enable a standard drive mechanism to be readily adapted to suit the different wiper angles used in different models of vehicle.

What is claimed is:

1. A windshield wiper drive mechanism comprising:

a housing;

an output shaft rotatably mounted in said housing;

a motor for driving said output shaft;

reciprocating means for converting the rotary motion of said motor to a reciprocating motion of said output shaft;

damping means for damping the rotation of said output shaft at least near the limits of its reciprocating motion, said damping means comprising resilient means operable to apply a radially-directed damping force to said output shaft and cam means disposed on said output shaft operable to engage said resilient means at least near the limits of the reciprocal movement of the output shaft.

2. A windshield wiper drive mechanism according to claim 1, wherein said resilient means extends at least partially around said output shaft.

3. A windshield wiper drive mechanism according to claim 1, wherein said resilient means is fixed to the housing.

4. A windshield wiper drive mechanism according to claim 1, wherein said resilient means comprises a substantially C-shaped spring element having two arms extending around said output shaft, the C-shaped spring element being fastened to the housing at a point substantially equidistant from the ends of said arms.

5. A windshield wiper drive mechanism according to claim 4, wherein said cam means is fixed to said output shaft for rotation between said arms, and is operable to engage said arms to apply a radially-directed damping force to said output shaft.

6. A windshield wiper drive mechanism according to claim 1, wherein said output shaft has an outer surface with a plurality of first splines, and said cam means comprises a collar and a cam profile, said collar having an internal bore having a plurality of second splines engaging the first splines of said output shaft.

7. A windshield wiper drive mechanism according to claim 6, wherein said cam profile is moulded from plastics material over said collar.

8. A windshield wiper drive mechanism according to claim 1, wherein said resilient means is mounted on said output shaft for rotation and is adapted to engage abutment means on said housing to apply a radially-directed damping force to said output shaft.

9. A windshield wiper drive mechanism according to claim 8, wherein said resilient means comprises a cam member fixed to said output shaft having at least one resilient arm extending radially outwardly therefrom and defining a resilient cam surface engagable with said abutment means comprising formations on said housing.

10. A windshield wiper drive mechanism according to claim 9, wherein said cam member comprises a pair of resilient arms extending radially outwardly of said output shaft which arms define resilient cam surfaces each being engagable with a corresponding formation on said housing.

11. A windshield wiper drive mechanism according to claim 10, wherein said arms are configured to lie substantially on the surface of a cylinder having an axis parallel to but spaced from the axis of said output shaft to define eccentrically disposed curved resilient cam surfaces for engaging the formations on the housing.

12. A windshield wiper drive mechanism according to claim 10, wherein said cam member is moulded in one piece from plastic material.

13. A windshield wiper drive mechanism according to claim 10, wherein said cam member comprises a boss mounted on said output shaft and said resilient arms comprise free ends of a C-shaped metal spring fixed to said boss.

14. A windshield wiper drive mechanism according to claim 9, wherein said formation comprises a generally cylindrical sleeve element surrounding said cam member, and being fixed to the housing with its longitudinal axis disposed eccentrically of the axis of said output shaft.

15. A windshield wiper drive mechanism according to claim 14, wherein said sleeve element is moulded from plastics material in one piece within an outer sleeve element supported in the housing, said sleeve element being located eccentrically with respect to said outer sleeve element.

16. A windshield wiper drive mechanism according to claim 1, wherein said damping means is operable to apply a radially-directed damping force to said output shaft over substantially the whole of its reciprocating movement.

17. A motor vehicle having the windshield wiper mechanism of claim 1.

18. An apparatus comprising:

a housing;

an output shaft mounted in said housing;

a motor for driving said output shaft;

a gear-wheel coupled to said motor;

a connecting rod assembly having an arm with a first portion coupled to said gear wheel and a second portion coupled to said output shaft to convert rotary motion of said motor to a reciprocating motion of said output shaft; and a cam element having a collar engaging the output shaft and a cam profile mounted on said collar.

19. The apparatus according to claim 18, further comprising a metal spring having two arms, said metal spring extending around the output shaft to substantially surround said cam element to damp the rotation of the output shaft at least near the limits of the reciprocal movement of the output shaft.

20. The apparatus according to claim 19, wherein said cam profile engages said metal spring.

21. The apparatus according to claim 18, wherein said cam element carries a spring element, said spring element being engagable with a fixed abutment.

* * * * *